United States Patent
Takahara et al.

(10) Patent No.: US 12,523,620 B2
(45) Date of Patent: Jan. 13, 2026

(54) X-RAY INSPECTION APPARATUS AND METHOD OF INSPECTION WITH X-RAYS

(71) Applicant: HITACHI HIGH-TECH ANALYSIS CORPORATION, Tokyo (JP)

(72) Inventors: Toshiyuki Takahara, Tokyo (JP); Tsuneo Sato, Tokyo (JP); Satoshi Matsubara, Tokyo (JP); Yuta Seki, Tokyo (JP); Kazuya Iwata, Tokyo (JP)

(73) Assignee: HITACHI HIGH-TECH ANALYSIS CORPORATION, Tokyo (JP)

( * ) Notice: Subject to any disclaimer, the term of this patent is extended or adjusted under 35 U.S.C. 154(b) by 216 days.

(21) Appl. No.: 18/137,901

(22) Filed: Apr. 21, 2023

(65) Prior Publication Data
US 2023/0384246 A1 Nov. 30, 2023

(51) Int. Cl.
*G01N 23/083* (2018.01)
*G01N 23/04* (2018.01)
*G01N 23/18* (2018.01)

(52) U.S. Cl.
CPC .......... *G01N 23/083* (2013.01); *G01N 23/04* (2013.01); *G01N 23/18* (2013.01); *G01N 2223/33* (2013.01)

(58) Field of Classification Search
CPC ...... G01N 23/083; G01N 23/04; G01N 23/18; G01N 2223/33; G01N 23/16; G01N 2223/1016; G01N 2223/307; G01N 2223/652
See application file for complete search history.

(56) References Cited

U.S. PATENT DOCUMENTS

| | | | | | |
|---|---|---|---|---|---|
| 4,974,249 | A | * | 11/1990 | Zweig | G01N 23/043 378/189 |
| 5,754,621 | A | * | 5/1998 | Suzuki | H05K 3/4638 378/57 |
| 6,009,145 | A | * | 12/1999 | Zweig | G01N 23/04 378/58 |
| 6,151,380 | A | * | 11/2000 | Zweig | G01N 23/04 439/74 |

FOREIGN PATENT DOCUMENTS

JP 2010286406 B1 12/2010

\* cited by examiner

*Primary Examiner* — Kiho Kim
(74) *Attorney, Agent, or Firm* — Holland & Hart LLP (57) ABSTRACT

Proposed are an X-ray inspection apparatus and a method of inspection with X-rays in which foreign objects in even a sample in which bending, sagging, or curving may occur can be inspected accurately. The X-ray inspection apparatus includes an X-ray source (2) which irradiates a sample with an X-ray, an X-ray detection unit (3) that is installed on a side opposite to the X-ray source with respect to the sample and detects the X-ray that passed through the sample, and a sample support mechanism (14) that supports the sample, wherein the sample is flexible and has a shape of a film, and the sample support mechanism has a support body (4) through which the X-ray is capable of passing and which is in close contact with and supports at least a portion of the sample, that is disposed between the X-ray source and the X-ray detection unit.

6 Claims, 8 Drawing Sheets

X-RAY INSPECTION APPARATUS AND METHOD OF INSPECTION WITH X-RAYS

CROSS REFERENCE TO RELATED APPLICATION

The present application claims priority to Japan Patent Application No. 2022-88713, filed May 31, 2022, the entire contents of which are incorporated herein for all purposes by this reference.

BACKGROUND OF THE INVENTION

Field of the Invention

The present disclosure relates to an X-ray inspection apparatus and a method of inspection with X-rays in which a foreign object in a sample can be detected.

DESCRIPTION OF THE RELATED ART

For example, a battery member including a cathode material of a lithium ion secondary battery may smoke or catch fire due to a short circuit when metal foreign objects are introduced into cells of the battery member. Particularly, recently, as demand for high-capacity applications including BEVs increases, high energy densification is accelerating, and the prevention of introduction of metal foreign objects in a manufacturing process is becoming a major challenge.

In addition, the thickness of coating of the cathode material of the lithium ion secondary battery tends to increase to secure energy density, and to reduce the loss of a coated portion, intemittent coating has become a trend.

A short circuit by a metal foreign object is caused by a foreign object introduced into the cathode material and by a foreign object attached to an uncoated portion in contact with an electrolyte. Because of this, the introduction of a foreign object into the whole surface of the cathode material including the uncoated portion is required to be prevented.

Conventionally, the foreign object inspection of the coated portion and the uncoated portion has been performed by visible light appearance inspection, and only foreign objects attached to a surface could be detected. Furthermore, over-detection of non-metal foreign objects caused yield deterioration. In addition, in the visible light appearance inspection, a foreign object introduced into the cathode material cannot be detected, and thus the performing of output monitoring in an aging process after cell formation has been used as a substitute for the inspection, but in the case that there are defects, loss due to the defects is large.

Because of this, it is being considered to inspect for a foreign object in the coated portion and the uncoated portion by using an X-ray inspection apparatus.

For example, as an X-ray inspection apparatus that detects a foreign object in a sample to be measured, an X-ray transmission inspection apparatus is disclosed in Patent Document 1 in which a sample is irradiated with X-rays from an X-ray source, and an X-ray detection unit receives the X-rays that passed through the sample to detect a foreign object through the intensity of the X-ray.

DOCUMENT OF RELATED ART (Patent Document 1) Japan Patent Application Publication No. 2010-286406

SUMMARY OF THE INVENTION

The related art described above has the problems described below.

Figure 7:
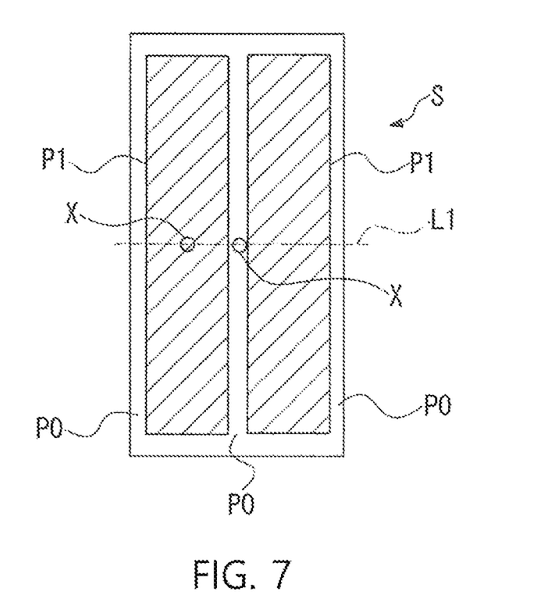
FIG. 7 is a top plan view of the sample of an electrode member having coated portion and uncoated portion of the cathode material.
Figure 8:
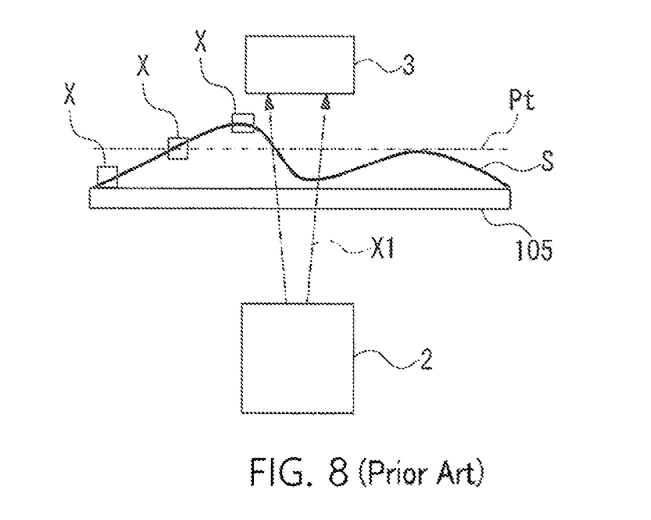
FIG. 8 is a schematic diagram illustrating the X-ray inspection apparatus in a case in which bending, sagging, or curving occurs in a sample in a conventional example of the X-ray inspection apparatus and the method of inspection with X-rays according to the present disclosure.

As illustrated in FIG. 7, an electrode member (a sample S) cut into a cell shape has the shape of a sheet and thus may bend, sag, or curve in units of several tens of mm. In this state, when the X-ray transmission inspection of the sample S is performed, the imaging of a foreign object X in the sample S may not be performed accurately. For example, as illustrated in FIG. 8, an X-ray source 2 and an X-ray detection unit 3 are disposed to face each other with a sample support 105 placed therebetween, and when the sample S bends or sags when inspecting a foreign object in the sample S by mounting the sample S of the electrode member on the sample support 105, the foreign object X in the sample S deviates from the focus Pt of the X-ray detection unit 3.

Figure 6:
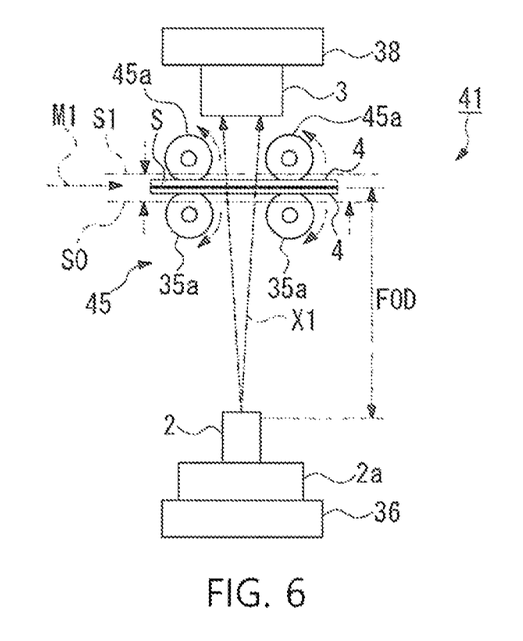
FIG. 6 is a schematic configuration diagram illustrating the X-ray inspection apparatus viewed from another side in the fourth embodiment.
Figure 9A:
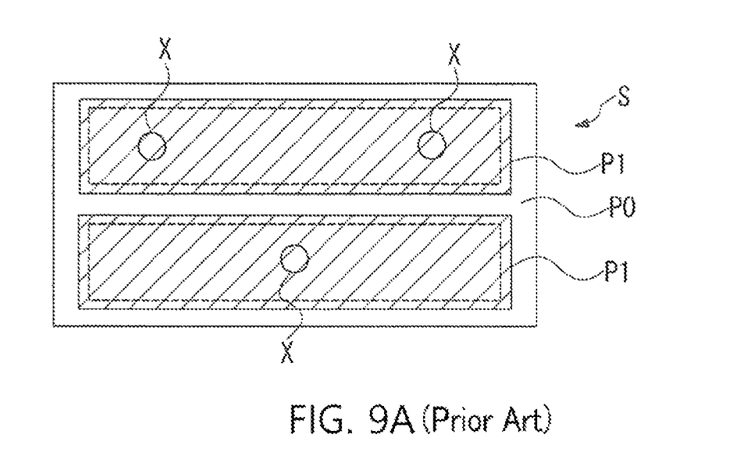
FIG. 9A is a top plan view of the sample of the electrode member having the bending illustrated in FIG. 8.
Figure 9B:
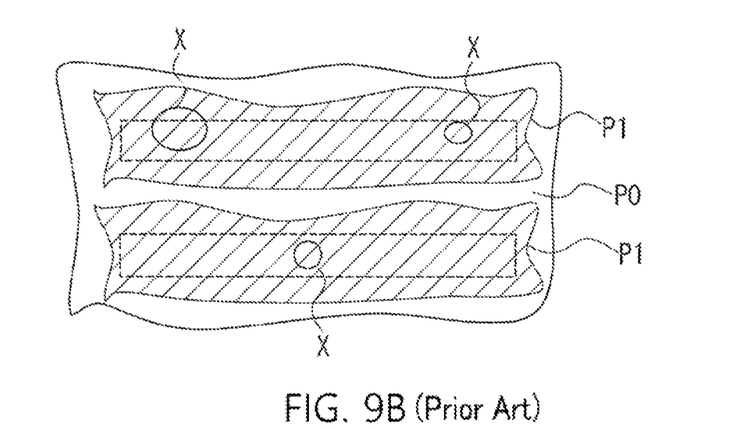
FIG. 9B is a conceptual image taken with a conventional X-ray inspection apparatus.

For example, when the sample S bends or sags as illustrated in FIG. 6 when the sample S viewed from the upper side has a foreign object X as illustrated in FIG. 9A, positional dependence of optical magnification occurs as illustrated in FIG. 9B, and thus correlation between the size and detection rate of the foreign object is reduced or an inspection range thereof is reduced due to change in the number of pixels for a work size or coating width. In addition, there is a restriction in a conveying Z-axis (thickness direction), so defocusing may be increased. Additionally, blurring in a conveying direction occurs due to disagreement with a focus position. That is, because of these, the foreign object may be detected larger than an actual size thereof.

In addition, when sagging or curving occurs, positional dependence of the amount of X-ray absorption occurs, and the length of the optical path of an X-ray differs depending on a position, and thus a correlation between the size and detection rate of a foreign object is reduced, or the risk of over-detection is increased.

In view of the above-mentioned challenges, the present disclosure is intended to propose an X-ray inspection apparatus and a method of inspection with X-rays in which foreign objects in even a sample in which bending, sagging, or curving may occur can be inspected accurately.

The present disclosure employs the following configurations to solve the above problems. That is, an X-ray inspection apparatus according to a first invention includes: an X-ray source which irradiates a sample with X-rays; an X-ray detection unit that is installed on a side opposite to the X-ray source with respect to the sample and detects the X-ray that passed through the sample; and a sample support mechanism that supports the sample, wherein the sample is in a shape of flexible film, and the sample support mechanism has an X-ray-transmittable support body that is in close contact with and supports at least a portion of the sample, that is disposed between the X-ray source and the X-ray detection unit.

In the X-ray inspection apparatus, the sample support mechanism includes the support body through which the X-ray can pass and which is in close contact with and supports at least a portion of the sample, that is disposed between the X-ray source and the X-ray detection unit, and thus the bending, sagging, or curving of the sample is corrected by the support body in close contact with the sample so that the imaging of the foreign object can be performed accurately. That is, in the process of the X-ray transmission inspection, the bending, sagging, or curving of the sample is restrained by the support body, and thus the distance of the sample from each of the X-ray source and the X-ray detection unit is stable, so the measurement accuracy of the sample is stable.

An X-ray inspection apparatus according to a second invention features that in the first invention, the support body may be a plate in shape of a flat plate on which the sample is disposed in close contact with a flat surface of the plate.

That is, in the X-ray inspection apparatus, the support body may be a plate in shape of a flat plate on which the sample is disposed in close contact with a flat surface thereof, and thus the sample may be corrected to be flat by the plate so that the imaging of the foreign object can be performed accurately.

An X-ray inspection apparatus according to a third invention features that in the second invention, the flat plate may be disposed on each of both surfaces of the sample with the sample placed between the flat plates.

That is, in the X-ray inspection apparatus, the flat plates are disposed respectively on the opposite surfaces of the sample with the sample placed between the flat plates, and the sample is placed between the pair of flat plates by being sandwiched by the pair of flat plates, and thus the bending, sagging, or curving of the opposite surfaces of the sample may be corrected, so the imaging of the foreign object may performed more accurately.

An X-ray inspection apparatus according to a fourth invention features that in the second or third invention, the sample support mechanism may be provided with a plate support that supports the flat plate by leveling at least a portion of the flat plate disposed between the X-ray source and the X-ray detection unit.

That is, in the X-ray inspection apparatus, the sample support mechanism may include the plate support supporting each of the flat plates by leveling at least a portion of the flat plate disposed between the X-ray source and the X-ray detection unit, so the flat plate in close contact with the sample may be prevented from sagging due to weight by the plate support. Particularly, when the sample and the flat plate (the support body) are long, or when the flat plate (the support body) is preset to be thin in consideration of X-ray transmittance, sagging of the same due to weight may not be prevented only by the flat plate (the support body), and thus the plate support may be added in the supporting, thereby enabling the X-ray inspection to be performed more accurately.

An X-ray inspection apparatus according to a fifth invention features that in the fourth invention, the X-ray inspection apparatus may further include: a moving mechanism capable of moving the sample, the X-ray source, and the X-ray detection unit relatively to each other, wherein the plate support may support the flat plate by constantly leveling the flat plate when irradiating the sample with the X-ray when the sample is moved.

That is, in the X-ray inspection apparatus, the plate support may support the flat plates by constantly leveling the flat plates when irradiating the sample with X-rays when the sample is moved. Accordingly, in the case of a long sample or a large sample, even if the X-ray irradiation is performed while changing an inspection portion of the sample by the moving mechanism, the inspection portion may be constantly maintained in a horizontal state, so it is possible to perform accurate inspection in a wide range.

An X-ray inspection apparatus according to a sixth invention features that in the X-ray inspection apparatus described in the first invention, the sample support mechanism may include: a sample moving mechanism which continuously moves the sample in a shape of band in an extension direction of the sample, and a roller member as the support body, the roller member being rotatable while the sample is in contact with a portion of an outer circumferential surface of the roller member, wherein the X-ray source may be disposed inside or outside the roller member, and the X-ray detection unit may be installed on the side opposite to the X-ray source with respect to a portion of the sample in contact with the outer circumferential surface of the roller member.

That is, in the X-ray inspection apparatus, the sample support mechanism may be provided with the roller member as the support body, the roller member being rotatable while the sample is in contact with the outer circumferential surface of the roller member. The X-ray source may be disposed inside or outside the roller member, and the X-ray detection unit may be installed on the side opposite to the X-ray source with respect to a portion of the sample in contact with the outer circumferential surface of the roller member, and accordingly, while the bending, sagging, or curving of the sample is corrected by the roller member, the sample being in a shape of a band may be continuously moved in the extension direction of the sample so that the imaging of the foreign object can be performed continuously and accurately. Particularly, the bending of even a sample having the shape of a long roll which moves continuously may be corrected by the roller member which is a free roller so that the inspection of a foreign object can be performed continuously.

A method of inspection with X-rays according to a seventh invention includes: supporting the sample which is in shape of flexible film by the support body; irradiating the sample with the X-rays from the X-ray source; and detecting the X-rays that passed through the sample by the X-ray detection unit installed on the side opposite to the X-ray source with respect to the sample, wherein the X-ray is capable of passing through the support body, and the support body is in close contact with at least a portion of the sample, that is disposed between the X-ray source and the X-ray detection unit.

That is, in the method of inspection with X-rays, the support bodies allow the X-ray to pass therethrough, and the support bodies are in close contact with at least a portion of the sample, that is disposed between the X-ray source and the X-ray detection unit. Accordingly, the bending, sagging, or curving of the sample is corrected by the support bodies which are in close contact with the sample so that the imaging of the foreign object can be performed accurately.

According to the present disclosure, the following effects are obtained.

That is, according to the X-ray inspection apparatus and the method of inspection with X-rays according to the present disclosure, the sample support mechanism includes the support bodies through which the X-ray can pass which are in close contact with and support at least a portion of the sample, that is disposed between the X-ray source and the X-ray detection unit, and thus the bending, sagging, or curving of the sample is corrected by the support bodies in close contact with the sample so that the imaging of the foreign object can be performed accurately.

Accordingly, in the X-ray inspection apparatus and the method of inspection with X-rays of the present disclosure, a foreign object may be inspected with high detection accuracy in the sample in which bending or sagging is likely to occur, for example, even in a cathode material member having the shape of a film in a lithium ion battery.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, a first embodiment of an X-ray inspection apparatus and a method of inspection with X-rays according to the present disclosure will be described with reference to FIG. 1.

Figure 1:
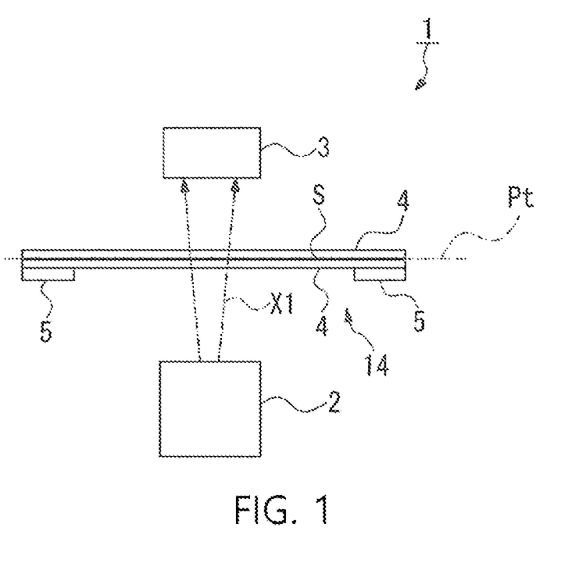
FIG. 1 is a schematic diagram illustrating an X-ray inspection apparatus in a first embodiment of the X-ray inspection apparatus and an method of inspection with X-rays according to the present disclosure.

As illustrated in FIG. 1, the X-ray inspection apparatus 1 of the embodiment includes an X-ray source 2 which irradiates the sample S with an X-ray X1, an X-ray detection unit 3 which is installed on a side opposite to the X-ray source 2 with respect to the sample S and detects an X-ray X1 that passed through the sample S, and a sample support mechanism 14 that supports the sample S.

The sample S is in shape of flexible film, and for example, as illustrated in FIG. 7, is a cathode material member of a lithium ion secondary battery having an uncoated portion P0 which is a cathode current collector (for example, aluminum, etc.) of the lithium ion secondary battery as a base material, and a coated portion P1 which is a cathode material of the lithium ion secondary battery which is a material different from the base material.

The sample support mechanism 14 includes support bodies 4 through which an X-ray X1 can pass and which are in close contact with and support at least a portion of the sample S disposed between the X-ray source 2 and the X-ray detection unit 3.

The support bodies 4 are flat plates between which the sample S is disposed in close contact with flat surfaces of the flat plates.

In addition, the support bodies 4 of the embodiment are a pair of flat plates disposed respectively on the opposite surfaces of the sample S with the sample S placed between the pair of flat plates.

The sample S which is an electrode member cut into a cell shape as illustrated in FIG. 7 is inserted between the support bodies 4 which are a pair of flat plates as illustrated in FIG. 1. While the sample S maintains a flat shape, the sample S is mounted on the sample support 5 to perform the X-ray inspection of the sample S.

That is, in this embodiment, the sample S is sandwiched between the pair of support bodies 4 to correct bending thereof.

Accordingly, the sample S is sandwiched from upper and lower sides by the pair of support bodies 4 having flat plate shapes to correct the bending or sagging of the sample S.

In addition, the focus Pt of the X-ray detection unit 3 matches the height position of the sample S which has been flattened by being sandwiched between the pair of support bodies 4.

The support body 4 is, for example, formed of a material having an intensity ratio between an X-ray X1 that passed through the uncoated portion P0 which is a portion with a low amount of X-ray absorption and an X-ray X1 that passed through the coated portion P1 which is a portion with a high amount of X-ray absorption smaller than when the support body 4 is not installed.

That is, the support body 4 of the embodiment is preferably a filter formed of a material that absorbs more X-rays X1 of a specific energy band than X-rays X1 of another energy band by corresponding to the sample S.

For example, in the case of the coated portion P1 which is the cathode material of the lithium ion secondary battery, the cathode material is a material (for example, Lithium cobaltate (LiCoO2), etc.) which absorbs an X-ray X1 of a lower energy zone (particularly, 5 keV~12 keV) more than an X-ray X1 of another energy zone (an energy zone above 12 keV). The support body 4 is preferably the filter corresponding thereto.

The support body 4 is formed of, for example, CFRP, light metal, or metal foil, etc.

The X-ray source 2, which is an X-ray lamp that can emit an X-ray X1, emits the X-ray X1 as a primary X-ray from a window such as a beryllium foil, the X-ray X1 being generated in such a manner that thermal electrons generated from a filament (a negative pole) in the lamp are accelerated by a voltage applied between the filament (the negative pole) and a target (a positive pole) and collide with W (tungsten), Mo (molybdenum), and Cr (chrome) of the target.

The X-ray detection unit 3 has a plurality of rows of line sensors along a specific direction so that pixels are arranged in a matrix shape, a TDI sensor (not shown) which is a X-ray detection unit which detects the X-ray X1 that passed through the sample S, and a line sensor calculation part (not shown) which controls the accumulation and transfer of charges in the plurality of pixels along the specific direction.

In addition, the X-ray inspection apparatus 1 of the embodiment includes a control part (not shown) which controls each of the parts, a display part (not shown) for displaying information such as a transmission image, and a sample moving mechanism (not shown) which moves the sample S in a specific direction, such as a motor, during the irradiation of the X-ray X1 from the X-ray source 2.

As described above, the sample S of the embodiment is a sheet of the electrode member used in the lithium ion secondary battery, but may be, for example, a material of a fuel cell formed in a strip shape, a gas diffusion layer, carbon paper, or a material of a long sheet shape used in pharmaceuticals.

In addition, when the sample S is an electrode sheet used in the lithium ion secondary battery, a metal foreign object X introduced therein is assumed to be, for example, Fe or SUS.

The method of inspection with X-rays in which the X-ray inspection apparatus 1 of the embodiment is used will be described.

The method of inspection with X-rays of the embodiment includes supporting the sample S being in a shape of flexible film by the support bodies 4, irradiating the sample S with the X-ray X1 from the X-ray source 2, and detecting the X-ray X1 that passed through the sample S by the X-ray detection unit 3 installed on a side opposite to the X-ray source 2 with respect to the sample S.

The X-ray X1 can pass through the support bodies 4, and in the supporting of the sample S by the support bodies 4, the support bodies 4 are brought into close contact with at least a portion of the sample S disposed between the X-ray source 2 and the X-ray detection unit 3. That is, the sample S is inserted between the support bodies 4 which are one pair of flat plates to be sandwiched therebetween.

In this state, the sample S is irradiated with the X-ray X1 through the support bodies 4 to be inspected, and during the inspection, the sample S having a film shape may be prevented from bending or sagging by the support bodies 4, thereby enabling the X-ray inspection to be accurately performed.

Accordingly, in the X-ray inspection apparatus 1 of the embodiment, the sample support mechanism 14 includes the support bodies 4 through which the X-ray X1 can pass which are in close contact with and support at least a portion of the sample S disposed between the X-ray source 2 and the X-ray detection unit 3, and thus the bending, sagging, or curving of the sample S is corrected by the support body 4 in close contact with the sample so that the imaging of the foreign object can be performed accurately. That is, in the process of the X-ray transmission inspection, the bending, sagging, or curving of the sample S is restrained by the support bodies 4, and thus the distance of the sample S from each of the X-ray source 2 and the X-ray detection unit 3 is stable, so the measurement accuracy of the sample S is stable.

In addition, the support bodies 4 are flat plates between which the sample S is disposed in close contact with flat surfaces thereof, and thus the sample S is corrected to be flat by the flat plates so that the imaging of the foreign object can be performed accurately.

Furthermore, the flat plates (the support bodies 4) are disposed on the opposite surfaces of the sample S with the sample S placed between the flat plates, and the sample S is placed between the one pair of flat plate (the support bodies 4) by being sandwiched by the one pair of flat plates. Accordingly, the bending, sagging, or curving of the opposite surfaces of the sample S can be corrected so that the imaging of the foreign object can be performed more accurately.

Next, the second to fourth embodiments of the X-ray inspection apparatus and the method of inspection with X-rays according to the present disclosure will be described below with reference to FIGS. 2 to 6. In addition, in description of each embodiment below, the same component described in the above embodiment is given the same reference numeral, and description thereof will be omitted.

Figure 2:
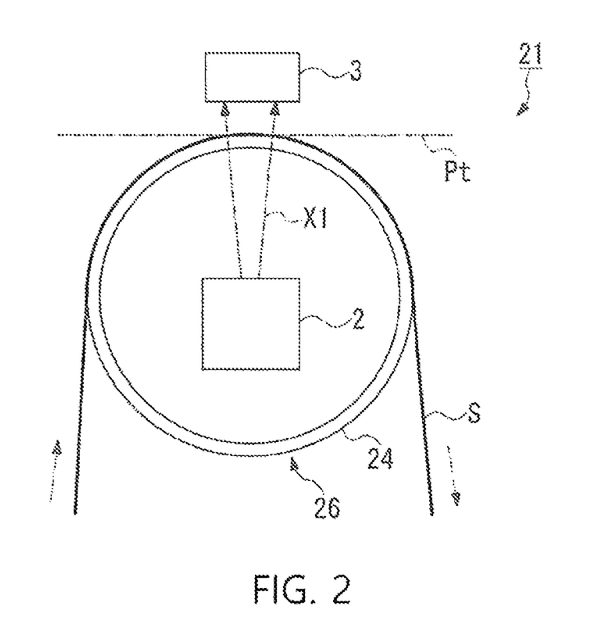
FIG. 2 is a schematic diagram illustrating an X-ray inspection apparatus in a second embodiment of the X-ray inspection apparatus and the method of inspection with X-rays according to the present disclosure.

As for difference between the second embodiment and the first embodiment, in the first embodiment, the sample S which is the electrode member cut into a cell shape is inserted between the pair of support bodies 4, and while the sample S is in the shape of a flat plate, the sample S is mounted on the sample support 5 to perform the X-ray inspection, whereas as illustrated in FIG. 2, an X-ray inspection apparatus 21 of the second embodiment is provided with a sample moving mechanism 26 which continuously moves the sample S having the shape of a long band in an extension direction of the sample S.

The sample moving mechanism 26 is provided with a roller member 24, as the support body, rotatable while the sample S is in contact with a portion of an outer circumferential surface of the roller member 24.

The X-ray source 2 is disposed inside or outside the roller member 24, and the X-ray detection unit 3 is installed on a side opposite to the X-ray source 2 with respect to a portion of the sample S in contact with the outer circumferential surface of the roller member 24. In addition, in the embodiment, the X-ray source 2 is disposed inside the roller member 24.

In addition, the roller member 24 may be a filter described above. That is, the roller member 24 is formed in a cylindrical shape with the same material as the support body 4 of the first embodiment.

In addition, for example, the sample moving mechanism 26 has components such as a plurality of rollers or motors capable of moving the long sample S in a roll-to-roll type in the extension direction of the sample S, and the roller member 24 is rotatably supported by a shaft member which is not shown. Accordingly, when the sample S moves in the extension direction of the sample S, the roller member 24, which is the support body, having a portion of the outer circumferential surface thereof in contact with the sample S also rotates.

Furthermore, as for the electrode member having a sheet shape, when the electrode member installed between the rolls of a roll-to-roll type. is simply irradiated with X-rays and inspected, the electrode member of a sheet shape extended by being installed between the rolls sags due to weight of the electrode member, and thus it is difficult to accurately perform the imaging of a foreign object.

However, the X-ray inspection apparatus 21 of the second embodiment is provided with the roller member 24, as the support body, rotatable while the sample S is in contact with a portion of the outer circumferential surface of the roller member 24, and thus while the bending, sagging, or curving of the sample S is corrected, the sample S in a shape of a band is continuously moved in the extension direction of the sample S so that the imaging of a foreign object X can be performed continuously and accurately. Particularly, even if the sample S has the shape of a long roll which continuously moves, the bending of the sample S is corrected by the roller member 24 which is a free roller so that the inspection of the foreign object X can be performed continuously.

Figure 3:
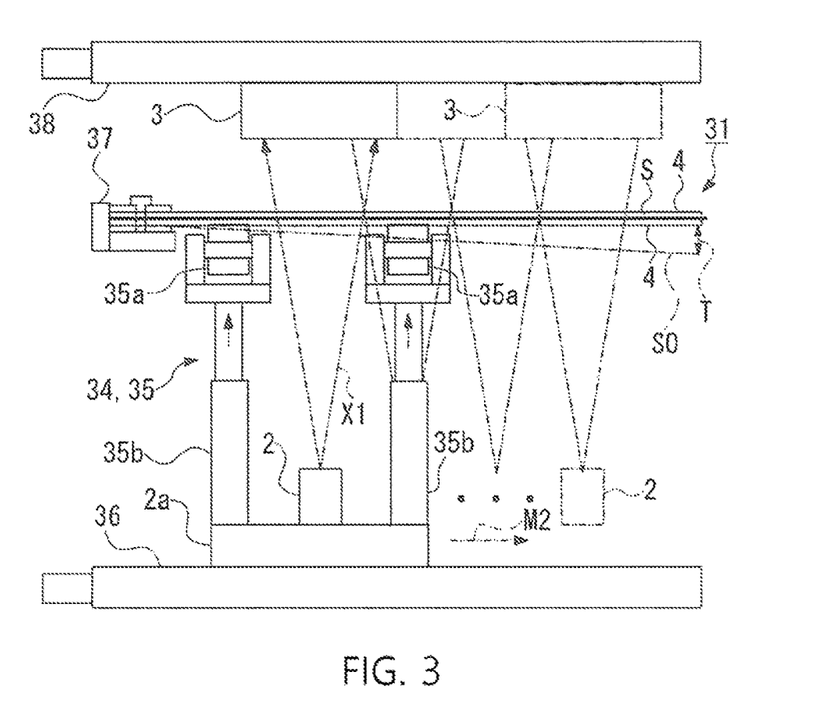
FIG. 3 is a schematic configuration diagram illustrating an X-ray inspection apparatus viewed from a side in a third embodiment of the X-ray inspection apparatus and the method of inspection with X-rays according to the present disclosure.
Figure 4:
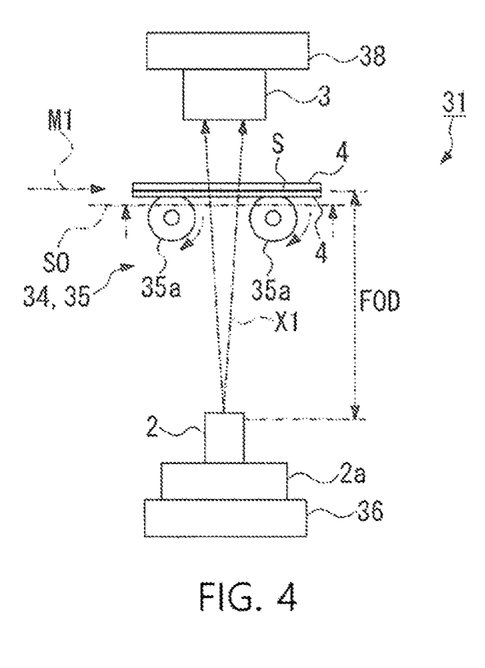
FIG. 4 is a schematic configuration diagram illustrating the X-ray inspection apparatus viewed from another side in the third embodiment.

Next, as for difference between the third embodiment and the first embodiment, the sample S is inserted and supported between the support bodies 4 which are one pair of flat plates, whereas in an X-ray inspection apparatus 31 of the third embodiment, as illustrated in FIGS. 3 and 4, a sample support mechanism 34 is provided with a plate support 35 that supports the flat plates (the support bodies 4) by leveling at least a portion of the flat plates (the support bodies 4) disposed between the X-ray source 2 and the X-ray detection unit 3.

That is, the X-ray inspection apparatus 31 of the third embodiment is provided with the moving mechanism which can relatively move the sample S, the X-ray source 2, and the X-ray detection unit 3, and the plate support 35 is preset to support the flat plates (the support bodies 4) by constantly leveling the flat plates when irradiating the sample S with the X-ray X1 when the sample S is moved.

The plate support 35 has the function of allowing at least a portion of the sample S inserted between the pair of support bodies 4 and disposed between the X-ray source 2 and the X-ray detection unit 3 to be located at a constant distance from the X-ray source 2.

The plate support 35 includes four sagging restraining rollers 35a disposed around an X-ray irradiation portion ranging from the X-ray source 2 to the X-ray detection unit 3, and four extendable shaft members 35b on which the sagging restraining rollers 35a are disposed.

Each of the extendable shaft members 35b is installed standing around the X-ray source 2 on a support 2a of the X-ray source 2.

The extendable shaft member 35b is a member capable of extending in such a manner that a piston part protrudes upward from a cylinder part by hydraulic pressure for example.

The support 2a is mounted on an X-axis stage 36 of the X-ray source side and can be moved toward an extension direction M2 by the X-axis stage 36 of the X-ray source side.

In addition, the X-ray detection unit 3 is mounted to the lower surface of an X-axis stage 38 of a detection part side, and can be moved toward the extension direction M2 by the X-axis stage 38 of the detection part side. Additionally, the X-axis stage 36 of the X-ray source side and the X-axis stage 38 of the detection part side can move the support 2a and the X-ray detection unit 3 at the same pitch by operating in cooperation with each other.

Furthermore, a Y-axis stage (not shown) as a mechanism which moves the sample S in the width direction M1 of the sample S is arranged by extending in a direction orthogonal to the X-axis stage 36 of the X-ray source side and the X-axis stage 38 of the detection part side. The sample support (not shown) of the sample S is fixed to the Y-axis stage, and the sample S can be moved in the width direction M1 by the Y-axis stage.

The sagging restraining roller 35a has a rotating shaft in the extending direction of the sample S and is rotatably shaft-supported.

As in the first embodiment, the sample S is in a sandwiched state in which the upper and lower surfaces of the sample S are sandwiched by the pair of support bodies 4, and is formed longer than the sample of the first embodiment. In addition, a first end portion of the sample S and the support bodies 4 is fixed by an end support part 37, but a second end portion thereof is open.

When the X-ray inspection apparatus 31 performs the X-ray inspection of the sample S, the lower surface of a first end side of the sample S is supported by the four sagging restraining rollers while the first end portion of the sample S sandwiched by the pair of support bodies 4 is first fixed by the end support part 37. In this case, the four extendable shaft members 35b preset the height positions of the sagging restraining rollers 35a so that the sample S, which is about to sag due to weight, is horizontal.

That is, a distance FOD between the focal point of the X-ray source 2 and the work pass line of the sample S is preset by the plate support 35 so that the distance has a normal value without the sagging of the sample S.

In addition, in a case in which the sample S and the support bodies 4 are not supported by the plate support 35, since the sample S is long, the sample S is in a state S0 sagged downward by a sagging amount Tat a second end side thereof due to weight of the sample S even though the sample S is inserted between the support bodies 4 as illustrated in FIG. 3.

As illustrated in FIG. 4, while the sample support and the sample S are moved in the width direction M1 by the Y-axis stage in a state in which the sample S and the support bodies 4 are supported by the plate support 35, the X-ray X1 scans the sample S to perform the X-ray inspection of the sample S in the width direction M1. In this case, while rotating, one pair of sagging restraining rollers 35a supports the sample S inserted between the support bodies 4, and thus even in a state in which the sample S, the X-ray source 2, and the X-ray detection unit 3 are moved relatively to each other, the sample S can be inspected without sagging.

Figure 5:
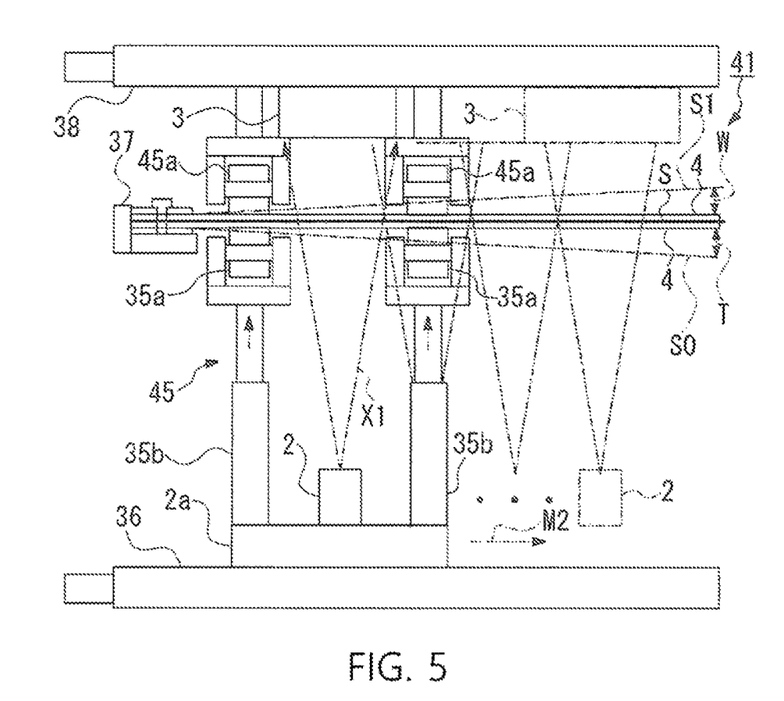
FIG. 5 is a schematic configuration diagram illustrating an X-ray inspection apparatus viewed from a side in a fourth embodiment of the X-ray inspection apparatus and the method of inspection with X-rays according to the present disclosure.

In addition, as illustrated in FIG. 5, while the X-axis stage 36 of the X-ray source side and the X-axis stage 38 of the detection part side move the support 2a and the X-ray detection unit 3 at a predetermined pitch along the extension direction M2 of the sample S, the X-ray inspection of the sample S in the width direction M1 is performed, so the X-ray inspection of the long sample S can be performed while the long sample S is restrained from sagging.

Furthermore, in the X-ray inspection apparatus 31, in addition to the long sample S, the sample S using a large substrate can be restrained from bending or sagging due to weight of the sample S.

Additionally, in the present disclosure, the four sagging restraining rollers 35a and the four extendable shaft members 35b are employed, but for example, two sagging restraining rollers 35a and two extendable shaft members 35b may constitute the plate support 35.

Accordingly, the X-ray inspection apparatus 31 of the third embodiment is provided with the plate support 35 that supports the flat plates (the support bodies 4) by leveling at least a portion of the flat plates (the support bodies 4) disposed between the X-ray source 2 and the X-ray detection unit 3, and thus the flat plates (the support bodies 4) in close contact with the sample S may be prevented from sagging due to weight by the plate support 35. Particularly, when the sample S and the flat plates (the support bodies 4) are long, or when the flat plates (the support bodies 4) are preset to be thin in consideration of X-ray transmittance, sagging of the same due to weight may not be prevented only by the flat plates (the support bodies 4), and thus, the plate support 35 is added in the supporting, thereby enabling the X-ray inspection to be performed more accurately.

In addition, the plate support 35 supports the flat plates (the support bodies 4) by constantly leveling the flat plates when irradiating the sample S with the X-ray X1 when the sample S is moved. Accordingly, in the case of a long sample S or a large sample S, even if the X-ray irradiation is performed while changing an inspection portion of the sample S by the moving mechanism, the inspection portion is constantly maintained in a horizontal state, so it is possible to perform accurate inspection in a wide range.

Next, as for difference between the fourth embodiment and the third embodiment, in the third embodiment, the lower surfaces of the sample S and the support body 4 are supported by the plate support 35 to restrain the sagging of the sample S, whereas in an X-ray inspection apparatus 41 of the fourth embodiment, as illustrated in FIGS. 5 and 6, the upper surfaces of the sample S and the support body 4 are supported by the plate support 45.

That is, the plate support 45 of the fourth embodiment includes four sagging restraining rollers 35a which press and support the sample S and the support body 4 by being in contact with the lower surface of the support body 4, and four bending restraining rollers 45a that support the sample S and the support body 4 by being in contact with the upper surface of the support body 4.

Each of the bending restraining rollers 45a is fixed to and hanging from the X-axis stage 38 of the detection part side or the X-ray detection unit 3 at the upper part of the bending restraining roller 45a. In addition, the bending restraining rollers 45a are disposed directly above corresponding sagging restraining rollers 35a, respectively. That is, the sample S and the support bodies 4 are sandwiched by the sagging restraining rollers 35a and the bending restraining rollers 45a, respectively, from the lower and upper side.

Like the sagging restraining roller 35a, the bending restraining roller 45a has a rotating shaft in the extension direction of the sample S and is rotatably shaft-supported.

When the X-ray inspection apparatus 41 performs the X-ray inspection of the sample S, the lower surface of the sample S is first supported by the four sagging restraining rollers 35a, and the upper surface of the sample S is supported by the four bending restraining rollers 45a.

In addition, when the sample S and the support body 4 are not supported by the bending restraining roller 45a, the sample S may be in a bent state Si by a bending amount W at the second end side thereof as illustrated in FIG. 5, but the bending restraining roller 45a may support the sample S and the support body 4 to correct the bending of the sample S which cannot be completely corrected by only the support body 4.

Furthermore, the X-ray inspection apparatus of the present disclosure employs four bending restraining rollers 45a, but may use two bending restraining rollers 45a instead of the four bending restraining rollers 45a to constitute the plate support 45.

The technical scope of the present disclosure is not limited to the above embodiments, and various changes may be made without departing from the spirit of the present disclosure.

What is claimed is:

1. An X-ray inspection apparatus comprising:
an X-ray source which irradiates a sample with X-rays;
an X-ray detection unit that is installed on a side opposite to the X-ray source with respect to the sample and detects the X-rays that passed through the sample; and
a sample support mechanism that supports the sample,
wherein the sample is in a shape of a flexible film
the sample support mechanism has an X-ray-transmittable support body that is in close contact with and supports at least a portion of the sample, that is disposed between the X-ray source and the X-ray detection unit and
the support body is disposed on each of both surfaces of the sample such that the sample is sandwiched between a pair of support bodies to correct bending or sagging of the sample by the pair of support bodies when the sample is supported by the support body.

2. The X-ray inspection apparatus of claim 1, wherein the support body is a plate in a shape of a flat plate on which the sample is disposed in close contact with a flat surface of the plate.

3. The X-ray inspection apparatus of claim 2, wherein the sample support mechanism is provided with a plate support that supports the plate in a shape of a flat plate by leveling at least a portion, of the plate in a shape of a flat plate, that is disposed between the X-ray source and the X-ray detection unit.

4. The X-ray inspection apparatus of claim 3, further comprising:
a moving mechanism capable of moving the sample, the X-ray source, and the X-ray detection unit relative to one another,
wherein the plate support supports the plate in a shape of a flat plate by constantly leveling the plate in a shape of a flat plate at a time of irradiation with the X-rays when the sample is moved.

5. The X-ray inspection apparatus of claim 1, wherein the sample support mechanism comprises:
a sample moving mechanism which continuously moves the sample in a shape of a band in an extension direction of the sample, and
a roller member as the support body, the roller member being rotatable while the sample is in contact with a portion of an outer circumferential surface of the roller member,
wherein the X-ray source is disposed inside or outside the roller member, and
the X-ray detection unit is installed on a side opposite to the X-ray source with respect to a portion of the sample in contact with the outer circumferential surface of the roller member.

6. A method of inspection with X-rays comprising:
supporting a sample that is in a shape of a flexible film with a support body;
irradiating the sample with X-rays from an X-ray source; and
detecting the X-rays that passed through the sample with an X-ray detection unit installed on a side opposite to the X-ray source with respect to the sample,
wherein the support body is X-ray-transmittable,
the support body is in close contact with at least a portion, of the sample, that is disposed between the X-ray source and the X-ray detection unit and
the support body is disposed on each of both surfaces of the sample such that the sample is sandwiched between a pair of support bodies to correct bending or sagging of the sample by the pair of support bodies when the sample is supported by the support body.

* * * * *